United States Patent Office 3,293,240
Patented Dec. 20, 1966

3,293,240
DISAZO DISPERSE DYESTUFFS
Eiji Koike and Fujio Kanazawa, Toyonaka-shi, and Hideo Otsuka, Fuse-shi, Japan, assignors to Sumitomo Chemical Company, Ltd., and Toyo Spinning Co., Ltd., Osaka, Japan, corporations of Japan
No Drawing. Filed Aug. 13, 1963, Ser. No. 301,885
Claims priority, application Japan, Aug. 15, 1962, 37/35,380
2 Claims. (Cl. 260—186)

The present invention relates to new disazo disperse dyestuffs, having the general formula,

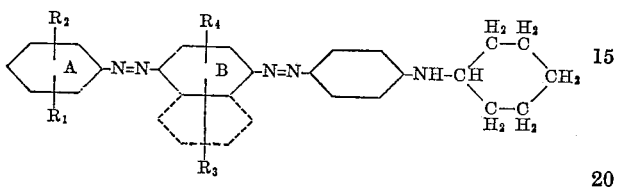

wherein $R_1$, $R_2$, $R_3$ and $R_4$ each represents a member selected from the group consisting of hydrogen atom, alkyl radical, alkoxy radical, nitro radical and halogen atom; A represents benzene nucleus; and B represents a nucleus selected from benzene and naphthalene nuclei, and to a method for producing the same.

An object of the present invention is to provide new disazo disperse dyestuffs which have excellent dye-ability to fibers, films and the like shaped articles, particularly to synthetic fibers, containing polyolefine such as polyethylene and polypropylene. Another object is to provide a method for producing the disazo disperse dyestuffs as mentioned above. Still another object is to provide a method of dyeing synthetic fibers, films and the like shaped articles, containing polyolefine such as polyethylene and polypropylene with high fastnesses to light, organic solvents and washing. A further object is to provide synthetic fibers, films and the like shaped articles containing polyolefine such as polyethylene and polypropylene which are dyed with a dyestuff as mentioned above. Other objects will be apparent from the following description.

The disazo disperse dyestuffs according to the invention may be produced by coupling a diazotized monoazoamino compound having the general formula,

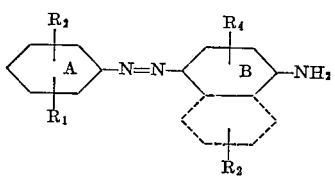

wherein $R_1$, $R_2$, $R_3$ and $R_4$ each represents a member selected from a non-dissociative substituent group consisting of hydrogen atom, alkyl radical, alkoxy radical, nitro radical and halogen atom, A represents benzene nucleus, and B represents a nucleus selected from benzene and naphthalene nuclei, with N-cyclohexylaniline.

The monoazo-amino compounds set forth hereinbefore include 4-amino-1,1'-azobenzene, 4-amino-naphthalene-1,1'-azobenzene and their derivatives having one or more non-dissociative substituents. These monoazo-amino compounds may be produced by coupling a diazotized amino compound (first component) having the general formula, wherein $R_1$ and $R_2$ each represents a member selected from a non-dissociative substituent group consisting of hydrogen atom, alkyl radical, alkoxy radical, nitro radical and halogen atom, and A represents a benzene nucleus, with an amino compound (second component) having the general formula, wherein $R_3$ and $R_4$ each represents the same group as provided in $R_1$ and $R_2$ of the first component, and B represents a nucleus selected from benzene and naphthalene nuclei.

Examples of the first component include aniline, 4-methylaniline, 3-methylaniline, 2-methylaniline, 2,5-dimethylaniline, 3,5-dimethylaniline, 2,4-dimethylaniline, 2,3-dimethylaniline, 4-methoxyaniline, 3-methoxyaniline, 2-methoxyaniline, 4-ethoxyaniline, 2-ethoxyaniline, 2,5-dimethoxyaniline, 2,4-dimethoxyaniline, 2-methoxy-5-methylaniline, 4-nitroaniline, 3-nitroaniline, 4-chloroaniline, 3-chloroaniline, 2-chloroaniline, 3-chloro-4-methylaniline, and the like.

Examples of the second component include aniline, 2-methylaniline, 2-ethylaniline, 2-chloroaniline (these being employed in the form of the ω-methanesulfonic acid derivative in most cases), 3-methylaniline, 2,5-dimethylaniline, 2,3-dimethylaniline 1,3-methoxyaniline, 2,5-dimethoxyaniline, 2-methoxy-5-methylaniline, 1-naphthylamine, 2-methoxy-1-naphthylamine, 2-ethoxy-1-naphthylamine, and the like.

The monoazo-amino compounds, produced by coupling a diazotized first component with a second component, are further diazotized and coupled with N-cyclohexylaniline (third component), whereby the new disazo dyestuffs of the present invention are obtained. The procedure for the diazotization and coupling may be obvious to those skilled in the art.

The disazo dyestuffs according to the present invention can be used for dyeing fibers (in the form of thread, yarn and woven and knitted fabrics and textiles), films and other shaped articles, containing polyolefines, for example, polyethylene and polypropylene in color tones of orange to red, under a dispersing condition in an aqueous medium according to the conventional procedures, with high exhaustion and fastnesses. Because of the fact that they have a cyclohexyl group in their molecule, further they have especially a great degree of affinity to the polyolefine articles, and it makes it possible to increase their selectivities to the articles to be dyed. Still further, they are characterized by the fact that the articles dyed with them have a brilliant color tone, and a high fastness to drycleaning, rubbing, light, sublimation, and organic solvents in practical use, and they are also suitably used for polyolefine textile printing.

The reason why the present dyestuffs have such a distinguishing characteristic, may be in the existence of N-cyclohexyl radical originated from N-cyclohexylaniline, the third component. When the present dyestuffs according to the invention are compared with the known dyestuffs obtained by coupling of the same diazotized monoazo-amino compound as in the present dyestuffs with other coupling components than in the present dyestuffs, the characteristics are significantly different from each other.

In the case of using N-phenylaniline (diphenylamine) as the third coupling component, the resulting dyestuff showed inferior dyeability to polyolefine fibers as compared with the dyestuffs according to the present invention. The dyestuff prepared by use of N-mono- or N,N-dialkyl-aniline as the third coupling component, showed considerably high degree of dyeability to polyolefine articles and a brilliant color tone, but low fastnesses to light and organic solvent. While the dyestuff according to the present invention, prepared by use of N-cyclohexylaniline as the third coupling component, showed superiority in the fastnesses.

And it is also one of the characteristics of the present invention that the dyestuffs having various color tones with high fastnesses are obtainable by suitable selection of the monoazoamino components to be coupled with N-cyclohexylaniline.

The disazo dyestuffs according to the present invention may be used in particles finely divided by a suitable means, more preferably, as a mixture of such particles with an agent such as alkylnaphthalenesulfonic acid-formaldehyde condensate. Dyeing of polyolefine articles is effected, as in the ordinary disperse dyestuffs, in the form of an aqueous dispersion or suspension at a bath temperature of 80° to 120° C., in the presence of an anionic or nonionic surface active agent, as the case may be.

The following examples are given in order to illustrate the invention and not to limit the invention, and, in the examples, parts and percent are by weight unless otherwise identified.

*Example 1*

To 250 parts of water, 19.7 parts of 4-amino-1,1'-azobenzene and 30 parts of 35% hydrochloric acid are added, and the mixture is stirred. Then 7 parts of sodium nitrite dissolved in water is added under stirring thereto.

The diazotization reaction is carried out under stirring for 2 hours at 15–20° C. On the other hand, a solution of 17.5 parts of N-cyclohexylaniline and 12 parts of 35% hydrochloric acid, dissolved in 150 parts of water, is cooled by adding 100 parts of ice. The solution of diazotized monoazo-amino compound prepared as above is added dropwise thereto, followed by slow dropwise addition of an aqueous sodium acetate solution into the reaction mixture to adjust the pH to 3–3.5 and the stirring is continued for 4–5 hours, while maintaining the temperature of the reaction mixture at not higher than 5° C.

The reaction mixture is filtered and the separated solid dyestuff is washed with a dilute hydrochloric acid and dried.

The dyestuff thus obtained is represented by the following formula,

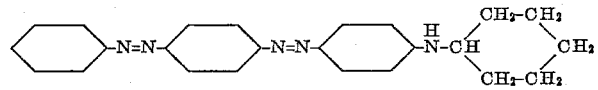

and dyes polyolefine fibers in brilliant orange color.

*Example 2*

Twenty two and one-half parts of 4-amino-2,4'-dimethyl-1,1'-azobenzene is diazotized in the same method as described in the Example 1 instead of 19.7 parts of 4-amino-1,1,'-azobenzene, and coupled with 17.5 parts of N-cyclohexylaniline as described in the Example 1. The dyestuff represented by the following formula is obtained.

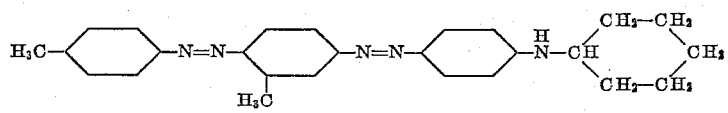

which dyes polyolefine fibers in reddish orange color.

*Example 3*

Two parts of the dyestuff prepared in Example 1 is finely divided and added to an aqueous solution of 3 parts of sodium oleyl sulfate dissolved in 8,000 parts of water.

Into the dispersion of the dyestuff, 200 parts of a fabric made of polyolefine fiber, is dipped and the temperature is raised slowly up to 80–120° C., and the fabric is dyed at this temperature for 1 hour.

Then, the fabric is washed with a 0.2% aqueous sodium alkylbenzenesulfonate solution (bath ratio 1:50) at 95° C. for 10 minutes, then washed with water and dried.

In this way, the polyolefine fiber can be dyed in orange color with high fastnesses to light, washing, and organic solvents.

*Example 4*

A dyeing is carried out in the same way as in the Example 3, except that 2 parts of a disazo dyestuff represented by the following formula,

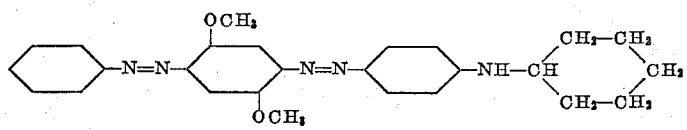

obtained by coupling diazotized 4-amino-2,5-dimethoxy-1,1'-azobenzene with N-cyclohexylaniline, is used in place of the dyestuff used in the Example 3. Polyolefine fabric is dyed in red color with high fastnesses to light, washing and organic solvents.

*Example 5*

The following table sets forth other disazo dyestuffs according to the present invention and the color tones when dyed onto a polyolefine fabric according to the invention. In the table, column I shows monoazo-amino components prepared by coupling a diazotized first component with a second component. Column II shows the disazo dyestuffs obtained by coupling the diazotized monoazo-amino component with the third component, N-cyclohexylaniline. Column III shows the color tones on polyolefine fabric.

| | I | II | III |
|---|---|---|---|
| 1 | (azo compound with NH₂, CH₃, CH₃) | (azo compound with NH-CH(CH₂CH₂)₂ cyclohexyl, CH₃, CH₃) | Orange. |
| 2 | (azo compound with OCH₃, CH₃, OCH₃) | (corresponding piperidyl derivative) | Red. |
| 3 | (naphthyl azo with NH₂) | (naphthyl azo with piperidyl) | Dark red. |
| 4 | (H₃C–, Cl, CH₃, NH₂) | (H₃C–, Cl, CH₃, piperidyl) | Reddish orange. |
| 5 | (O₂N–, CH₃, NH₂) | (O₂N–, CH₃, piperidyl) | Dark red. |
| 6 | (H₃C–, OC₂H₅, NH₂ naphthyl) | (H₃C–, OC₂H₅, piperidyl naphthyl) | Dark red. |
| 7 | (azo compound with NH₂, CH₃) | (azo compound with piperidyl, CH₃) | Orange. |

What we claim is:
1. A disazo disperse dyestuff having the formula:
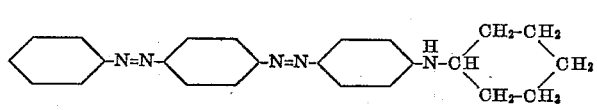
2. A disazo disperse dyestuff having the formula:
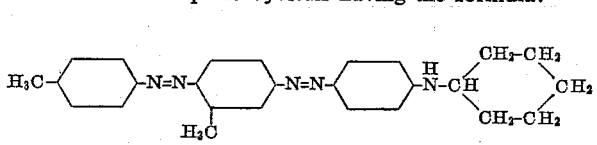
References Cited by the Examiner
UNITED STATES PATENTS
| | | | |
|---|---|---|---|
| 2,216,446 | 10/1940 | McNally et al. | 260—191 XR |
| 2,420,630 | 5/1947 | Taylor | 260—187 |
| 2,782,185 | 2/1957 | Merian | 260—186 |
| 3,089,868 | 5/1963 | Gaetani | 260—186 |
| 3,096,140 | 7/1963 | Gaetani | 260—187 XR |
| 3,158,435 | 11/1964 | Gaetani et al. | 8—41 |
| 3,160,467 | 12/1964 | Sureau et al. | 8—41 |
CHARLES B. PARKER, *Primary Examiner.*
R. FINNEGAN, *Examiner.*
FLOYD D. HIGEL, *Assistant Examiner.*